United States Patent

[11] 3,552,483

| [72] | Inventors | Reginald Harry North<br>Headington, Oxford;<br>Peter Norman Taylor, Luton, England |
|---|---|---|
| [21] | Appl. No. | 793,096 |
| [22] | Filed | Jan. 22, 1969 |
| [45] | Patented | Jan. 5, 1971 |
| [73] | Assignee | General Motors Corporation<br>Detroit, Mich.<br>a corporation of Delaware |
| [32] | Priority | Jan. 25, 1968 |
| [33] | | Great Britain |
| [31] | | No. 3981/68 |

[54] MOTOR VEHICLE COOLER SYSTEMS
4 Claims, 3 Drawing Figs.

[52] U.S. Cl. ............................................................ 165/11
[51] Int. Cl. ..................................................... F58f 19/00

[50] Field of Search .......................................... 123/41.04;
236/35, 35.2; 165/32—36, 11

[56] References Cited
UNITED STATES PATENTS

| 1,820,091 | 8/1931 | Reavis ........................ | 236/35.2 |
| 2,495,861 | 1/1950 | Newton ....................... | 236/11X |

*Primary Examiner*—Edward J. Michael
*Attorneys*—J. L. Carpenter and R. J. Outland ABSTRACT: A motor vehicle engine-cooler system comprising a radiator, a fan, a duct surrounding the fan and extending to the radiator, and a pivoted flap mounted to close an opening in a wall of the duct. When the air pressure in the duct exceeds the ambient air pressure in the engine compartment by a predetermined amount, the flap pivots to open the opening against a biasing force which normally urges the flap to the position in which it closes the opening.

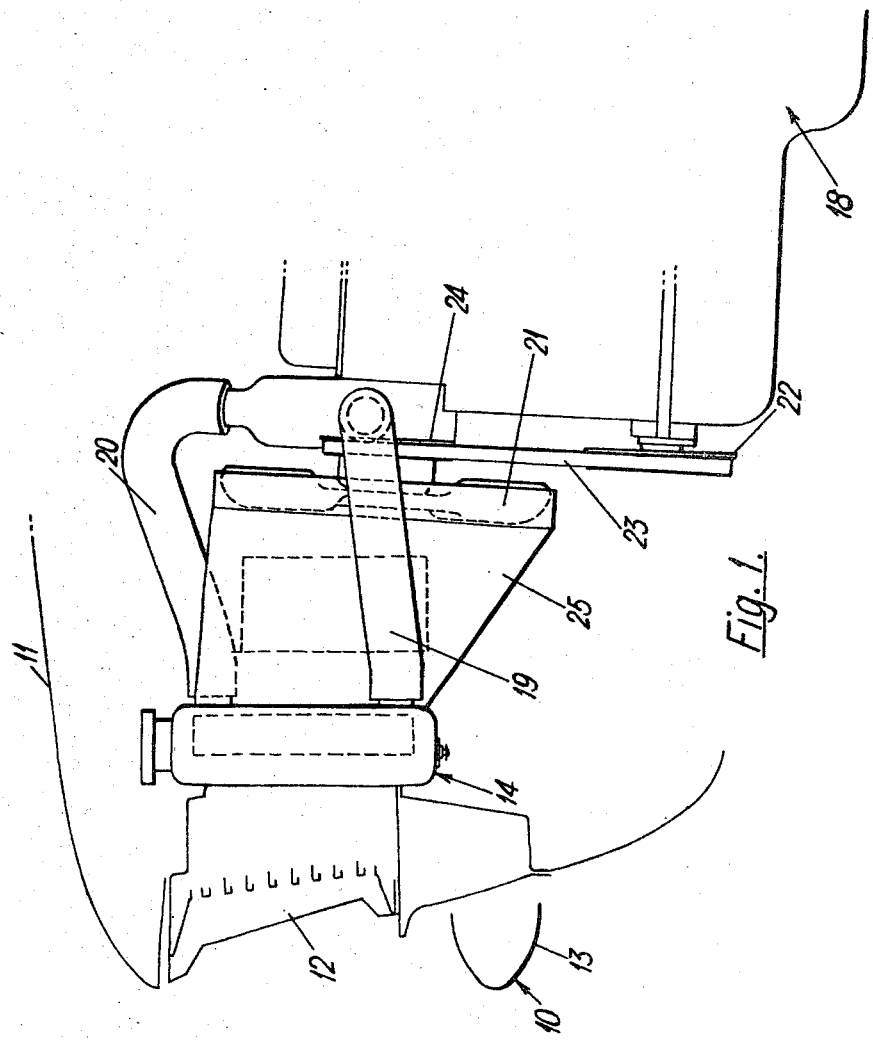

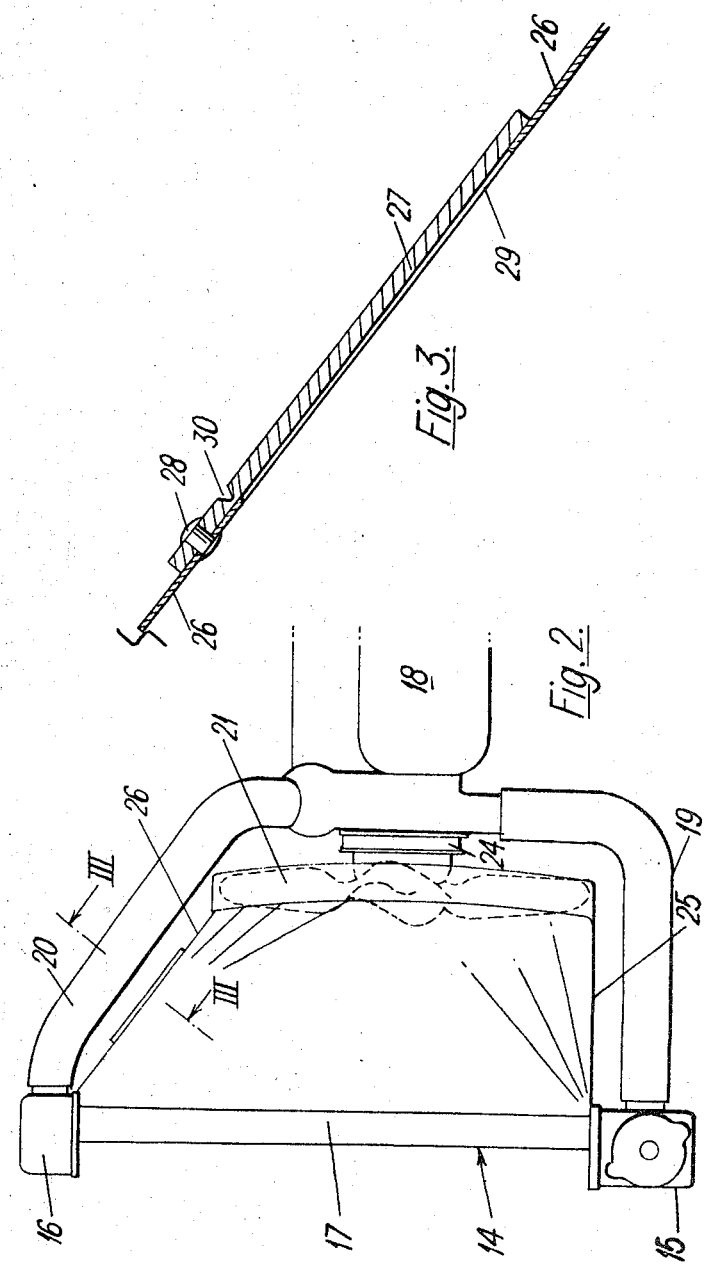

MOTOR VEHICLE COOLER SYSTEMS

This invention relates to motor vehicle engine-cooler systems.

It is known to provide a shroud around an engine-driven fan the shroud extending up to the radiator of the engine-cooler system (see for example U.S. Pat. No. 1,829,374). The purpose of such shrouds is to provide improved cooling of the coolant in the radiator.

However, with forwardly facing radiators, at higher vehicle speeds, cooling is obtained additionally by ram air passing through the radiator. When a shroud is provided to direct at least some of the air passing through the radiator to the fan, at these higher vehicle speeds the fan may not be able to discharge the air in the duct sufficiently rapidly. This can cause a pressure buildup in the duct with a consequently lower rate of flow of cooling air through the radiator.

A motor vehicle engine-cooler system according to the invention comprises a radiator, a fan, a duct to direct air from the radiator to the fan, and a pressure-sensitive device arranged to divert a portion of the air in the duct to bypass the fan when the air pressure in the duct exceeds the ambient air pressure in the engine compartment by a predetermined amount.

The scope of the invention is defined by the appended claims; how the invention may be performed is hereinafter particularly described with reference to the accompanying drawings, in which:

FIG. 1 is a side view of cooler system according to the invention mounted in the front engine compartment of a motor vehicle;

FIG. 2 is a plan view of the cooler system; and

FIG. 3 is a sectional view, to an enlarged scale, taken on the line III—III in FIG. 2.

Referring now to FIG. 1 of the drawings, only the front end of a motor vehicle designated generally by the numeral 10 is shown. The vehicle 10 includes a usual hood or bonnet 11 which closes the engine compartment. The front end of the vehicle is of conventional construction and includes grille 12 and bumper 13. Behind the grille 12, there is located a crossflow type radiator designated generally by the reference numeral 14, the radiator having side tanks 15 and 16 (FIG. 2) which communicate with each other by way of horizontal flow pipes in portion 17 of the radiator.

The radiator 14 forms part of the engine cooler system, only part of the engine being shown in FIGS. 1 and 2. The engine is designated generally by the reference numeral 18 and the radiator is connected to the water jacket of the engine by flow and return pipes 19 and 20, respectively. The pipe 19 is connected to the bottom of side tank 15 and return pipe 20 is connected to the top of side tank 16.

A fan 21 is rotatably mounted on the engine 18 and is arranged to be driven from the crankshaft of the engine by pulley 22, belt 23 and pulley 24 mounted coaxial with fan 21.

The fan 21 is intended to draw air through radiator 14 so as to cool the latter, but to improve this cooling effect, a duct 25 is provided which forms an enclosed passage between the radiator 14 and fan 21. As shown in FIGS. 1 and 2 wholly surrounds fan 21 and all or substantially all the air drawn through radiator 14 can pass through the duct 25 to fan 21 to be ejected into the engine compartment, during normal running of the vehicle.

Turning now to FIGS. 2 and 3 of the drawings, wall 26 of the duct 25 incorporates a pressure-sensitive device for a purpose which will be specified later. The pressure-sensitive device comprises a resiliently biased flap 27 which is secured to the wall 26 by rivets 28 and serves, during normal running of the vehicle, to close an opening 29 formed in the wall 26 of the duct 25. The flap 27 has a V-groove 30 which affords a pivot for the flap 27. The flap 27 is biased towards the position in which it closes opening 29, this biasing being provided either by the inherent natural resilience of the material, or example a resilient plastics material, from which the flap 27 is made, or else by the action of gravity. Alternatively, although not shown, spring biasing or a counterweight arrangement may be provided to bias flap 27 to the position in which it closes opening 29.

The purpose of biased flap 27 is to divert a portion of the air in the duct 25 to bypass fan 21 when the pressure in the duct 25 exceeds the ambient air pressure in the engine compartment by a predetermined amount. When such a pressure is achieved within the duct 25, flap 27 pivots about groove 30 against its biasing to allow a portion of the air in duct 25 to bypass the fan 21 and thereby reduce the air pressure in the duct 25 and permit a greater rate of flow of air through the radiator 14.

When the motor vehicle in which the cooling system is mounted is stationary, the fan is required to draw air through the radiator in order to cool the coolant liquid in the cooling system. However, when the vehicle is in motion, with the radiator mounted in a forwardly facing direction as shown in the drawings, cooling is achieved additionally by air being forced by a ram effect through the radiator in addition to air being drawn by the fan. At certain relatively high speed, it may be that the fan cannot discharge air in to the engine compartment from the duct sufficiently rapidly to achieve adequate cooling of the liquid coolant and a buildup of air under pressure in the duct between the radiator and the fan may be produced. However, the pressure sensitive device in the form of the biased flap will permit some of this air to bypass the fan when the pressure in the duct exceeds the ambient pressure in the engine compartment by a predetermined amount. With the flow of bypass air, more cooling air can pass through the radiator and thereby cool the liquid coolant in the cooling system satisfactorily.

We claim:

1. A motor vehicle engine-cooler system comprising a radiator, a fan, a duct to direct air from the radiator to the fan, and a pressure-sensitive device arranged to divert a portion of the air in the duct to bypass the fan when the air pressure in the duct exceeds ambient ambient air pressure in the engine compartment by a predetermined amount.

2. A motor vehicle engine-cooler system comprising a radiator, fan, a duct to direct air from the radiator to the fan, and a pressure-sensitive device mounted in a wall of the duct an arranged to divert a portion of the air in the duct to bypass the fan when the air pressure in the duct exceeds the ambient air pressure in the engine compartment by a predetermined amount.

3. A motor vehicle engine-cooler system comprising a radiator, a fan operable to draw air through the radiator, a duct extending between the radiator and the fan and surrounding the fan, a flap mounted on a wall of the duct to normally close an opening in the wall, the flap being outwardly movable with respect to the interior of the duct, and means biasing the flap inwardly to a position closing said opening, whereby a predetermined excess pressure within the duct will overcome the biasing means and open the flap so as to permit a portion of the air passing through the radiator to bypass the fan.

4. A motor vehicle engine-cooler system comprising a radiator, a fan, a duct extending between the radiator and the fan and surrounding the fan, a flap mounted on a wall of the duct to normally close an opening in the wall, the flap being made of resilient plastics material and having a groove about which it is pivotably against the inherent resilient opposition of the flap when the air pressure in the duct exceeds the ambient air pressure in the engine compartment by a predetermined amount.